(12) United States Patent
Guo et al.

(10) Patent No.: US 11,881,665 B2
(45) Date of Patent: Jan. 23, 2024

(54) CHARGER WITH ROTATING PLUG

(71) Applicant: Dongguan Aohai Technology Co., Ltd., Guangdong (CN)

(72) Inventors: Xiugen Guo, Guangdong (CN); Chaohua Zhou, Guangdong (CN); Dehu Xiao, Guangdong (CN); Leibo Ran, Guangdong (CN); Jixiang Peng, Guangdong (CN); Longbiao Hu, Guangdong (CN)

(73) Assignee: Dongguan Aohai Technology Co., Ltd., Dongguan (CN)

( * ) Notice: Subject to any disclaimer, the term of this patent is extended or adjusted under 35 U.S.C. 154(b) by 0 days.

(21) Appl. No.: 18/125,729

(22) Filed: Mar. 24, 2023

(65) Prior Publication Data
US 2023/0318241 A1 Oct. 5, 2023

(30) Foreign Application Priority Data
Apr. 1, 2022 (CN) .......................... 202210338690.6

(51) Int. Cl.
*H01R 35/04* (2006.01)
*H01R 13/44* (2006.01)
(Continued)

(52) U.S. Cl.
CPC ............ *H01R 35/04* (2013.01); *H01R 13/44* (2013.01); *H01R 24/68* (2013.01); *H02J 7/0042* (2013.01); *H01R 2103/00* (2013.01)

(58) Field of Classification Search
CPC ........ H01R 35/04; H01R 13/44; H01R 24/68; H02J 7/0042
(Continued)

(56) References Cited

U.S. PATENT DOCUMENTS

| 6,939,150 B1 * | 9/2005 | Lanni | H01R 35/04 439/174 |
| 8,096,817 B2 * | 1/2012 | Lee | H01R 29/00 439/640 |

(Continued)

FOREIGN PATENT DOCUMENTS

| CN | 9G10940 M348418 | * | 1/2006 |
| CN | 201112897 Y | | 9/2008 |

(Continued)

OTHER PUBLICATIONS

Notice of Allowance of counterpart Chinese Patent Application No. 202210338690.6 dated Jun. 29, 2022.
(Continued)

*Primary Examiner* — Richard V Muralidar (57) ABSTRACT

Provided is a charger, comprising a charger body, a plug and a tooth ring; the charger body is provided with a receiving cavity for receiving the plug, and the tooth ring is arranged in the charger body; the plug comprises a connecting part, a positioning part and a pin, an upper surface of the connecting part exposes the receiving cavity, and the pin is installed on the upper surface, one end of the positioning part is connected to a lower surface of the connecting part, and another end of the positioning part extends into a central through hole of the tooth ring, which is provided with a clamping tooth, the positioning part is provided with a plurality of clamping grooves, and when the plug in the receiving cavity is rotated, the clamping tooth is clamped into one of the clamping grooves to limit the rotation angle of the plug.

8 Claims, 7 Drawing Sheets

(51) Int. Cl.
*H02J 7/00* (2006.01)
*H01R 24/68* (2011.01)
*H01R 103/00* (2006.01)

(58) Field of Classification Search
USPC .... 320/107, 111; 439/10, 13, 104, 131, 134, 439/135, 136, 838
See application file for complete search history.

(56) References Cited

U.S. PATENT DOCUMENTS 9,011,165 B2 * 4/2015 Liu ..................... H01R 31/065
439/131
10,862,238 B2 * 12/2020 Hasan ................. H01R 13/502

FOREIGN PATENT DOCUMENTS

| | | |
|---|---|---|
| CN | 201178173 Y | 1/2009 |
| CN | 203312590 U | 11/2013 |
| CN | 203660573 U | 6/2014 |
| CN | 105048591 A | 11/2015 |
| CN | 107465031 A | 12/2017 |
| CN | 207038895 U | 2/2018 |
| CN | 209730865 U | 12/2019 |
| CN | 113346281 A | 9/2021 |
| CN | 215681179 U | 1/2022 |
| TW | M348418 U | 1/2009 |

OTHER PUBLICATIONS

2nd Office Action of counterpart Chinese Patent Application No. 202210338690.6 dated Jun. 22, 2022.

* cited by examiner

CHARGER WITH ROTATING PLUG

CROSS REFERENCE TO RELATED APPLICATIONS

The present application claims the benefit of Chinese Patent Application No. 202210338690.6 filed on Apr. 1, 2022, the contents of which are incorporated herein by reference in their entirety.

TECHNICAL FIELD

The present application belongs to the technical field of charging equipment, in particular to a charger.

BACKGROUND

With the increasing functions of electronic devices such as mobile phones and tablet computers, the power consumption of mobile phones increases, and the charging frequency also increases. The existing Chinese, American and Japanese standard chargers are limited by the size of internal components and the size of charger case, and limited by the requirements of safety regulations on creepage distance. This makes the two sides perpendicular to the plug insertion direction, one side being more than 19.3 cm and the other side being more than 27.2 cm, relatively large in both length and width dimensions, and thus very inconvenient to carry. And when in use, the relative position of the pin and the charger body is fixed, which causes great inconvenience when used in sockets with different receptacle directions.

SUMMARY

Aiming at the problem of inconvenient use caused by the fixed relative position between the existing pin and the charger body, a charger is provided.

In order to solve the above technical problems, the embodiments of the present application provide a charger, which includes a charger body, a plug and a tooth ring;
  the charger body is provided with a receiving cavity for receiving the plug, and the tooth ring is arranged in the charger body;
  the plug includes a connecting part, a positioning part and a pin, an upper surface of the connecting part exposes the receiving cavity, and the pin is installed on the upper surface of the connecting part, one end of the positioning part is connected to a lower surface of the connecting part, and another end of the positioning part extends into a central through hole of the tooth ring; and the central through hole of the tooth ring is provided with a clamping tooth, the positioning part is provided with a plurality of clamping grooves, and when the plug in the receiving cavity is rotated, the clamping tooth is clamped into one of the clamping grooves to limit rotation angle of the plug.

Optionally, the positioning part includes a positioning main body and a plurality of outer teeth arranged on the positioning main body, and the clamping groove is formed between the outer teeth and surface of the positioning main body and between two adjacent outer teeth.

Optionally, the positioning main body is provided with a first side and a second side arranged oppositely, and both the first side and the second side are provided with the outer teeth; the clamping teeth includes a first clamping tooth and a second clamping tooth, the first clamping tooth is clamped in the clamping groove on the first side, and the second clamping tooth is clamped in the clamping groove on the second side.

Optionally, the plug further includes a rotating part connected between the connecting part and the positioning part;
  the receiving cavity includes a first cavity, a second cavity and a spacer plate for separating the first cavity and the second cavity, the spacer plate is provided with a connecting hole communicating the first cavity and the second cavity, the rotating part is arranged in the connecting hole, the connecting part is arranged in the first cavity, and the positioning part is arranged in the second cavity.

Optionally, an annular groove is arranged in the middle of the rotating part, and an edge of the connecting hole is arranged in the annular groove.

Optionally, the tooth ring is provided with a flange, the second cavity is provided with a limit groove, and the flange is arranged in the limit groove.

Optionally, the charger body includes an upper cover and a lower cover connected in snap-fit, the upper cover is provided with a first groove, a second groove and a first spacer plate for separating the first groove and the second groove, the lower cover is provided with a third groove, a fourth groove and a second spacer plate for separating the third groove and the fourth groove; the first groove and the third groove form the first cavity, the second groove and the fourth groove form the second cavity, and the first spacer plate and the second spacer plate form the spacer plate.

Optionally, the charger further includes a left pendulum block rotatably connected to the upper cover and a right pendulum block rotatably connected to the lower cover;
  the left pendulum block includes a left pendulum body, a left gear and a left rotating shaft, the left gear is installed on the left pendulum body, the left rotating shaft is installed on the left gear, a left rotating groove is arranged on an inner surface of the upper cover, and the left gear and the left rotating shaft are arranged in the left rotating groove;
  the right pendulum block includes a right pendulum body, a right gear and a right rotating shaft, the right gear is installed on the right pendulum body, the right rotating shaft is installed on the right gear, a right rotating groove is arranged on an inner surface of the lower cover, and the right gear and the right rotating shaft are arranged in the right rotating groove;
  the left gear is engaged with the right gear, and the left pendulum block and the right pendulum block can rotate to expose or hide the pin.

Optionally, the left pendulum body is provided with a first pin slot, and the right pendulum body is provided with a second pin slot, and the pin can be hidden in a cavity formed by the first pin slot and the second pin slot.

Optionally, the left pendulum body is provided with a left avoidance groove, and the right pendulum body is provided with a right avoidance groove, when the left pendulum block and the right pendulum block swing to a fully unfolded state, a distance between the left avoidance groove and the right avoidance groove is greater than a length of the connecting part, so as to avoid hitting the rotating connecting part.

The charger provided by the embodiments of the application is light and thin overall, and is convenient to carry and pack. The plug can rotate at certain angles, and the plug can be positioned at the position of the angle by clamping the clamping tooth in the clamping groove; a plurality of clamping grooves are provided, so that rotation of the plug at multiple angles can be realized, and the pin can be inserted into a charging socket at any rotation angles without affecting usage effect of the charger.

Reference signs in the drawings are as follows:
1. Plug; 11. Connecting part; 12. Positioning part; 121. Positioning main body; 1211. First side; 1212. Second side; 122. Outer teeth; 123. Clamping groove; 13. Pin; 14. Rotating part; 141. Annular groove;
2. Tooth ring; 21. First clamping tooth; 22. Second clamping tooth; 23. Flange;
3. Upper cover; 31. Fastener; 32. First groove; 33. Second groove; 34. First spacer plate; 35. Left rotating groove;
4. Lower cover; 41. Fastening groove; 42. Third groove; 43. Fourth groove; 44. Second spacer plate; 45. Right rotating groove;
5. Connecting hole; 6. Limit groove;
7. Left pendulum block; 71. Left pendulum body; 711. First pin slot; 712. Left avoidance groove; 72. Left gear; 73. Left rotating shaft;
8. Right pendulum block; 81. Right pendulum body; 811. Second pin slot; 812. Right avoidance groove; 82. Right gear; 83. Right rotating shaft.

DETAILED DESCRIPTION OF DISCLOSED EMBODIMENTS

In order to make the beneficial effects, technical solutions and technical problems solved by the present application clearer, the present application will be further illustrated in detail with reference to the drawings and embodiments. It should be understood that the specific embodiments described here are merely for illustrating the present application, not for limiting the present application.

As shown in FIG. 1 to FIG. 9, a charger provided by an embodiment of the application includes a charger body, a plug 1 and a tooth ring 2, and a receiving cavity for receiving the plug 1 is arranged on the charger body, the plug 1 can rotate in the receiving cavity, the tooth ring 2 is arranged in the charger body, and electronic components such as PCB boards are accommodated in the charger body.

The plug 1 includes a connecting part 11, a positioning part 12 and a pin 13; the upper surface of the connecting part 11 exposes the receiving cavity, and the pin 13 is installed on the upper surface of the connecting part 11. One end of the positioning part 12 is connected to the lower surface of the connecting part 11, and another end of the positioning part 12 extends into the central through hole of the tooth ring 2, so that the positioning of the plug 1 is realized through the tooth ring 2 and the positioning part 12.

Figure 5:
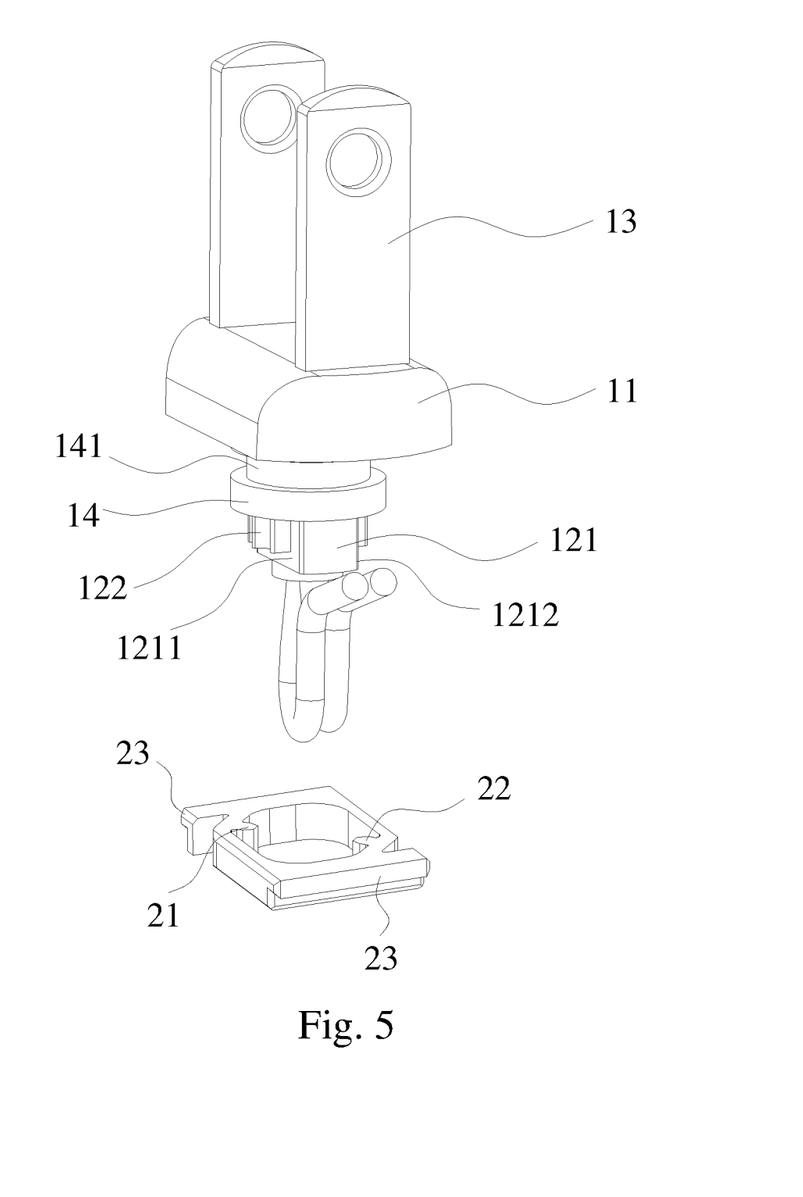
FIG. 5 is a schematic diagram of a plug and a tooth ring provided by an embodiment of the present application.
Figure 6:
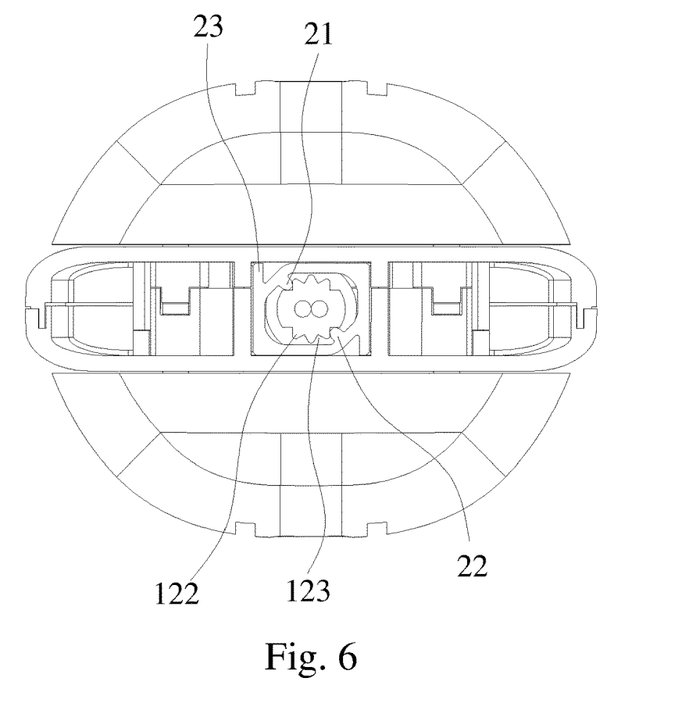
FIG. 6 is a schematic diagram showing the cooperation between the positioning part and tooth ring when the plug is at position 0° according to an embodiment of the present application.
Figure 7:
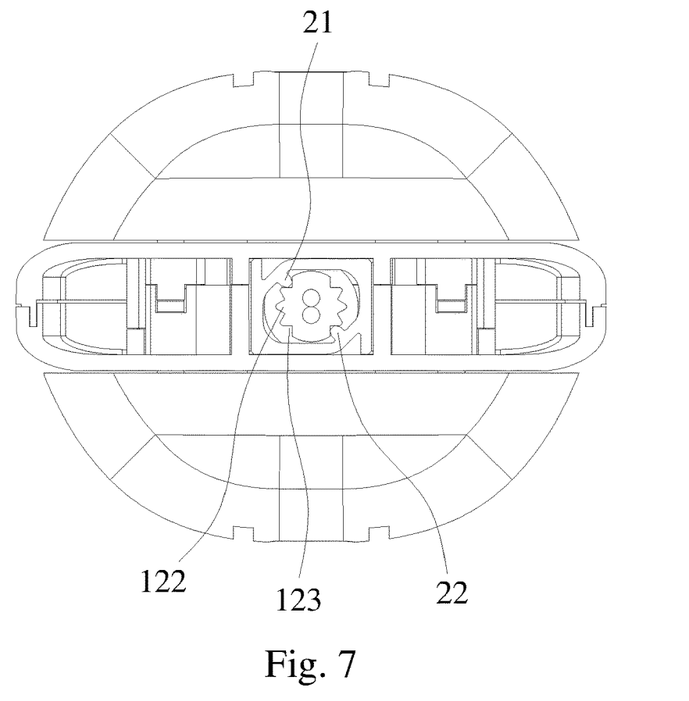
FIG. 7 is a schematic diagram showing the cooperation between the positioning part and tooth ring when the plug is at position 90° according to an embodiment of the present application.

Specifically, the central through hole of the tooth ring 2 is provided with a clamping tooth, the positioning part 12 is provided with a plurality of clamping grooves 123, and when the plug 1 in the receiving cavity is rotated, the clamping tooth is clamped into one of the clamping grooves 123 to limit rotation angle of the plug 1.

According to the charger provided by the embodiment of the application, the plug 1 can rotate at certain angles, and the plug 1 can be positioned at the position of the angle by clamping the clamping tooth in the clamping groove 123; a plurality of clamping grooves are provided, so that rotation of the plug 1 at multiple angles can be realized, and the pin 13 can be inserted into a charging socket at any rotation angles without affecting usage effect of the charger. Moreover, the charger is relatively light and easy to carry and pack.

As shown in FIGS. 6 to 9, in one embodiment, the rotation angle of the plug 1 is 0-90°. The number and position of the clamping grooves 123 can be set according to the desired angles of the plug 1. In this embodiment, four clamping grooves 123 are provided, and the rotation angles of the plug 1 are 0°, 30°, 60° and 90°.

As shown in FIG. 5, in an embodiment, the positioning part 12 includes a positioning main body 121 and a plurality of outer teeth 122 arranged on the positioning main body 121. The clamping groove 123 is formed between the outer teeth 122 and the surface of the positioning main body 121 and between two adjacent outer teeth 122.

As shown in FIG. 5, in an embodiment, the positioning main body 121 is provided with a first side 1211 and a second side 1212 which are oppositely arranged, and both the first side 1211 and the second side 1212 are provided with the outer teeth 122. The clamping teeth include a first clamping tooth 21 and a second clamping tooth 22, and on the first side 1211, the clamping groove 123 is formed between the outer teeth 122, the first side 1211 and two adjacent outer teeth 122, and the first clamping tooth 21 is clamped in the clamping groove 123 on the first side 1211; on the second side 1212, the clamping groove 123 is formed between the outer teeth 122, the second side 1212 and two adjacent outer teeth 122, and the second clamping tooth 22 is clamped in the clamping groove 123 on the second side 1212.

As shown in FIG. 6 and FIG. 7, in one embodiment, three outer teeth 122 are arranged on the first side 1211, four clamping grooves 123 are formed on the first side 1211, and three outer teeth 122 are arranged on the second side 1212, four clamping grooves 123 are formed on the second side 1212. In the central through hole of the tooth ring 2, the first clamping tooth 21 and second clamping tooth 22 are located on the same inclined straight line, and the inclined straight line is the bisector of the central through hole of the tooth ring 2. When the plug 1 is at position 0°, the first clamping tooth 21 is clamped in the first clamping groove 123 on the first side 1211. The second clamping tooth 22 is clamped in the fourth clamping groove 123 on the second side 1212. When the plug 1 is at position 90°, the first clamping tooth 21 is clamped in the fourth clamping groove 123 on the first side 1211, and the second clamping tooth 22 is clamped in the first clamping groove 123 on the second side 1212.

As shown in FIG. 5, in an embodiment, the plug 1 further includes a rotating part 14 connected between the connecting part 11 and the positioning part 12. The receiving cavity includes a first cavity, a second cavity and a spacer plate for separating the first cavity and second cavity, and the spacer plate is provided with a connecting hole 5 communicating the first cavity and second cavity; the connecting part 11 is arranged in the first cavity, the positioning part 12 is arranged in the second cavity, the rotating part 14 is arranged in the connecting hole 5, and the shape of the connecting hole 5 is determined according to the shape of the rotating part 14, and the cross-section size of the connecting hole 5 is slightly larger than that of the rotating part 14. The plug 1 rotates around the axis of the connecting hole 5, and the plug 1 can be prevented from deviating from the rotation axis by fitting the rotating part 14 into the connecting hole 5.

Figure 3:
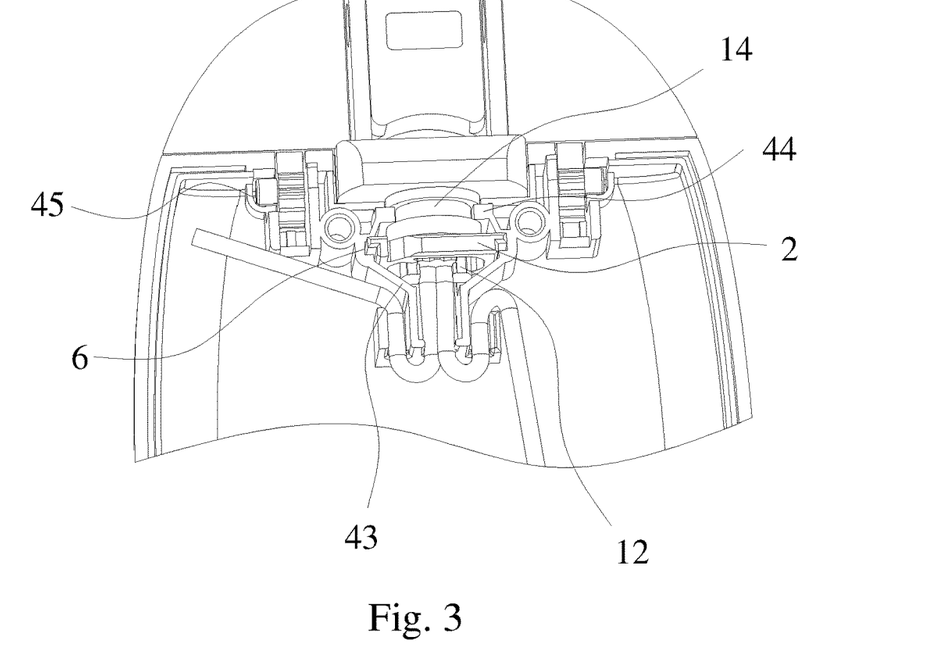
FIG. 3 is a schematic diagram of a lower cover provided by an embodiment of the present application.

As shown in FIG. 3, in an embodiment, the middle of the rotating part 14 is provided with an angular groove 141, and the edge of the connecting hole 5 is arranged in the angular groove 141, which can prevent the plug 1 from floating up and down in the axis direction of the connecting hole 5 during rotation.

As shown in FIG. 3 and FIG. 5, in one embodiment, the tooth ring 2 is provided with a flange 23, and the second cavity is provided with a limit groove 6, and the flange 23 is arranged in the limit groove 6, so as to keep the tooth ring 2 in the second cavity, thus preventing the tooth ring 2 from being moved or driven by the positioning part 12.

In an embodiment, two flanges 23 re provided, and the two flanges 23 are oppositely arranged on the tooth ring 2; two limit grooves 6 are arranged, and each flange 23 is arranged in the corresponding limit groove 6.

Figure 2:
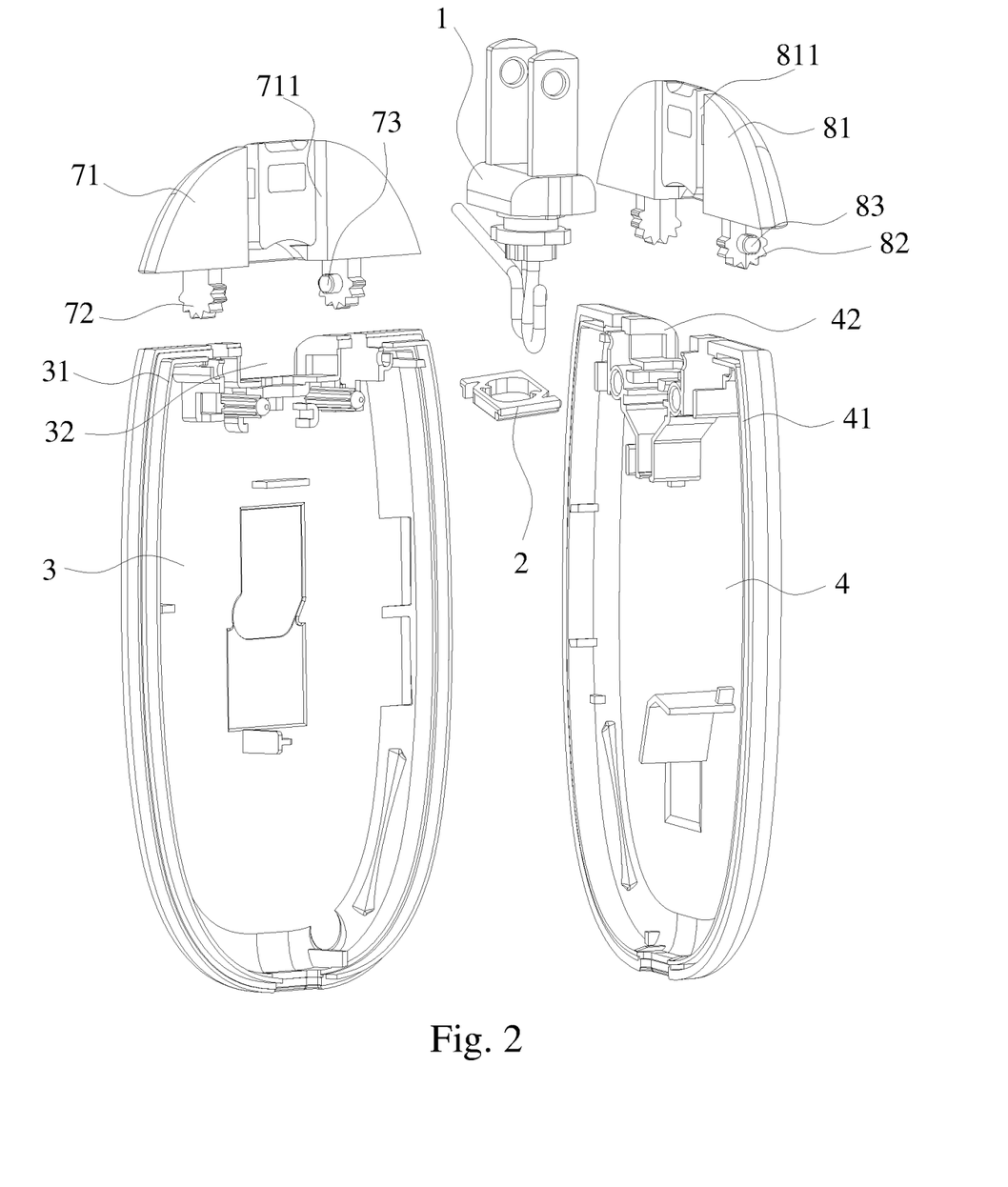
FIG. 2 is an exploded view of a charger provided by an embodiment of the present application.

As shown in FIG. 2, in an embodiment, the charger body includes an upper cover 3 and a lower cover 4 which are connected in a snap-fit manner, a fastener 31 is arranged on the upper cover 3, and the fastener 31 is arranged along the outer edge of the upper cover 3. The lower cover 4 is provided with a fastening groove 41, which is arranged along the outer edge of the lower cover 4, and the fastener 31 is arranged in the fastening groove 41.

Figure 4:
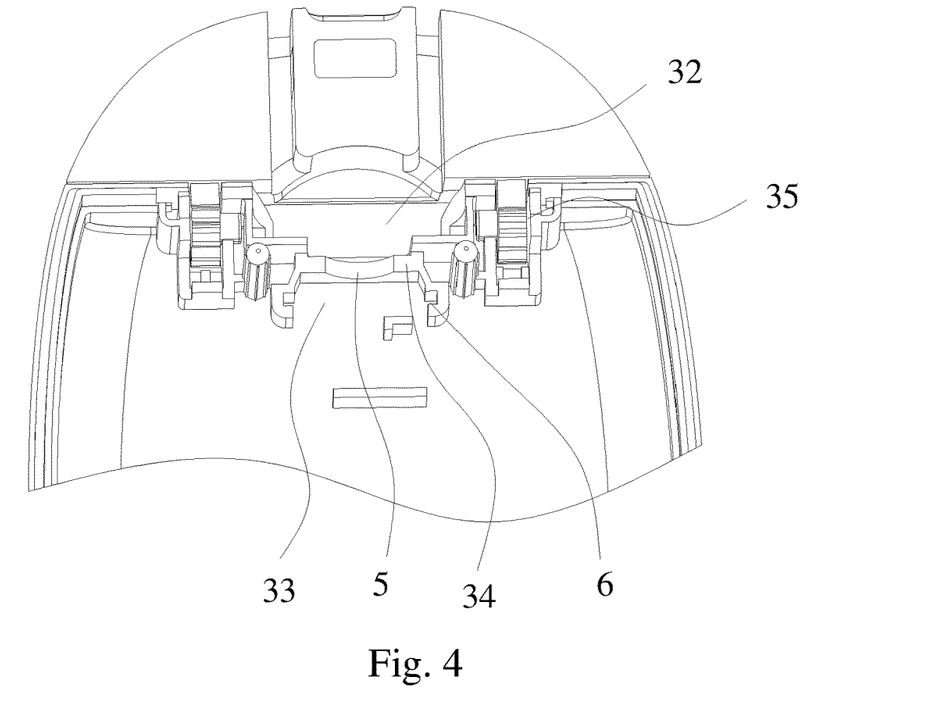
FIG. 4 is a schematic diagram of an upper cover provided by an embodiment of the present application.

As shown in FIG. 2, FIG. 3 and FIG. 4, the upper cover 3 is provided with a first groove 32, a second groove 33 and a first spacer plate 34 for separating the first groove 32 and second groove 33. The lower cover 4 is provided with a third groove 42, a fourth groove 43 and a second spacer plate 44 for separating the third groove 42 and fourth groove 43. When the upper cover 3 and lower cover 4 are fastened together, the first groove 32 and third groove 42 form the first cavity, the second groove 33 and fourth groove 43 form the second cavity, and the first spacer plate 34 and second spacer plate 44 form the spacer plate.

Figure 1:
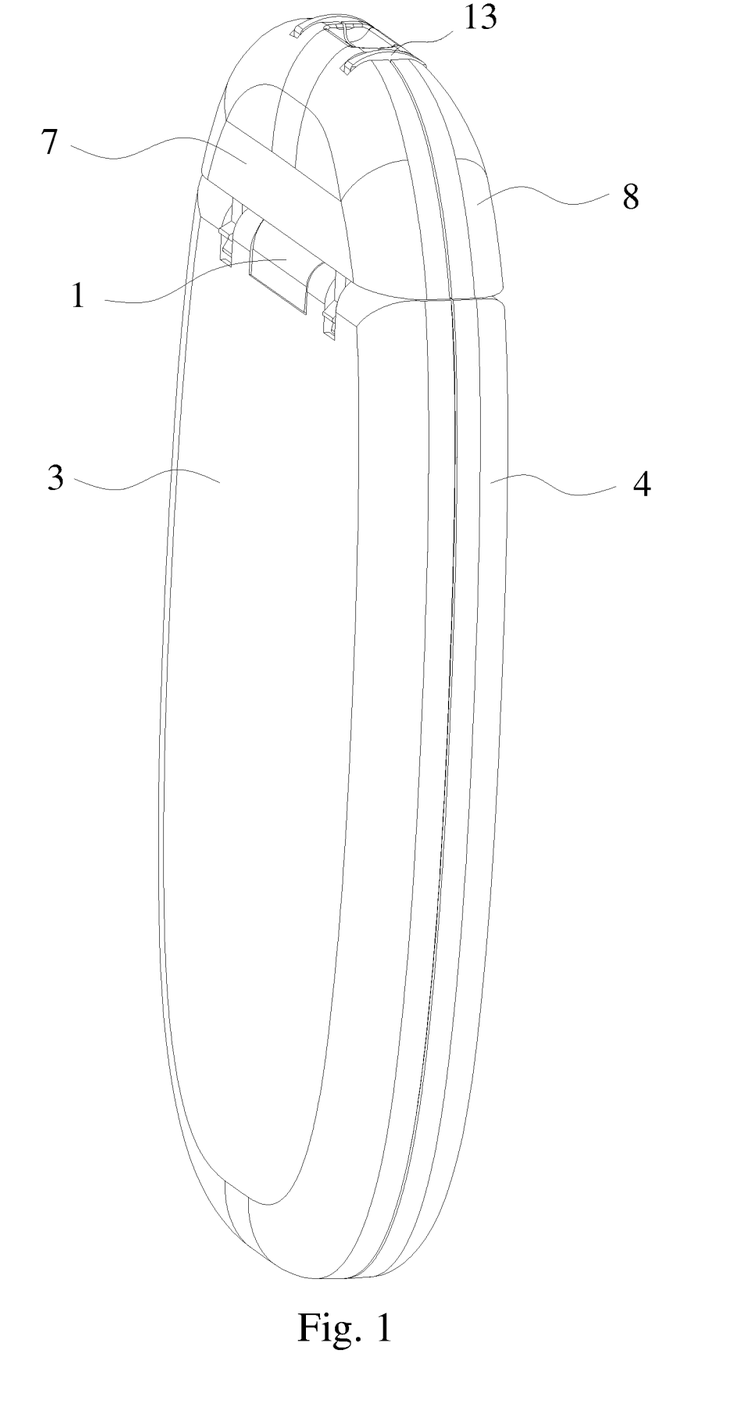
FIG. 1 is a schematic diagram of a charger provided by an embodiment of the present application.

As shown in FIG. 1, in an embodiment, the charger further includes a left pendulum block 7 rotatably connected to the upper cover 3 and a right pendulum block 8 rotatably connected to the lower cover 4.

As shown in FIG. 2, the left pendulum block 7 includes a left pendulum body 71, a left gear 72 and a left rotating shaft 73. The left gear 72 is installed on the left pendulum body 71, the left rotating shaft 73 is installed on the left gear 72, a left rotating groove 35 is arranged on the inner surface of the upper cover 3, and the left gear 72 and the left rotating shaft 73 are arranged in the left rotating groove 35.

The right pendulum block 8 includes a right pendulum body 81, a right gear 82 and a right rotating shaft 83. The right gear 82 is installed on the right pendulum body 81, the right rotating shaft 83 is installed on the right gear 82, and the left rotating shaft 73 and the right rotating shaft 83 extend in opposite directions. A right rotating groove 45 is arranged on the inner surface of the lower cover 4, and the right gear 82 and the right rotating shaft 83 are arranged in the right rotating groove 45.

The left gear 72 meshes with the right gear 82. Rotate the left pendulum block 7 or the right pendulum block 8, the left pendulum block 7 and the right pendulum block 8 can rotate simultaneously to expose or hide the pin 13. The maximum rotation angle of the left pendulum block 7 and the right pendulum block 8 is 90°. In this case, the left pendulum block 7 and right pendant block 8 swing to a fully unfolded state, the charger is in a usable state, the plug 1 can be rotated, and when the left pendulum block 7 and right pendulum block 8 swing back to the initial position, the pin 13 is hidden between the left pendulum block 7 and right pendulum block 8.

In this embodiment, the thickness of the charger is small. In the charging process, when user touches the position closest to the pin of the charger body, the creepage distance is short, which does not meet the safety requirements. By setting the left pendulum block 7 and right pendulum block 8, the creepage distance is increased when fully unfolded, which can prevent the user from touching unsafe positions and thus improve safety.

Figure 8:
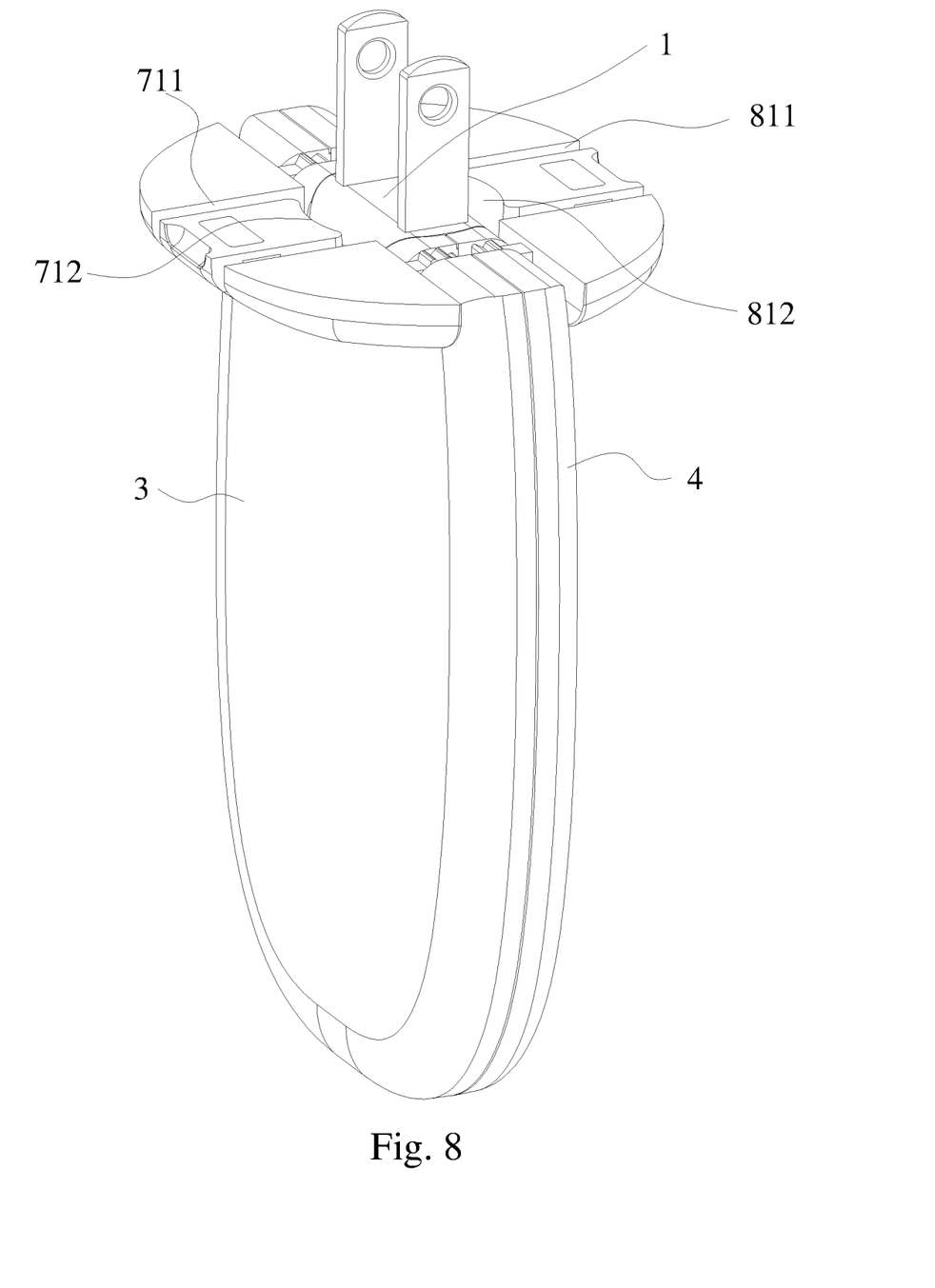
FIG. 8 is a schematic diagram showing the plug at position 0° according to an embodiment of the present application.
Figure 9:
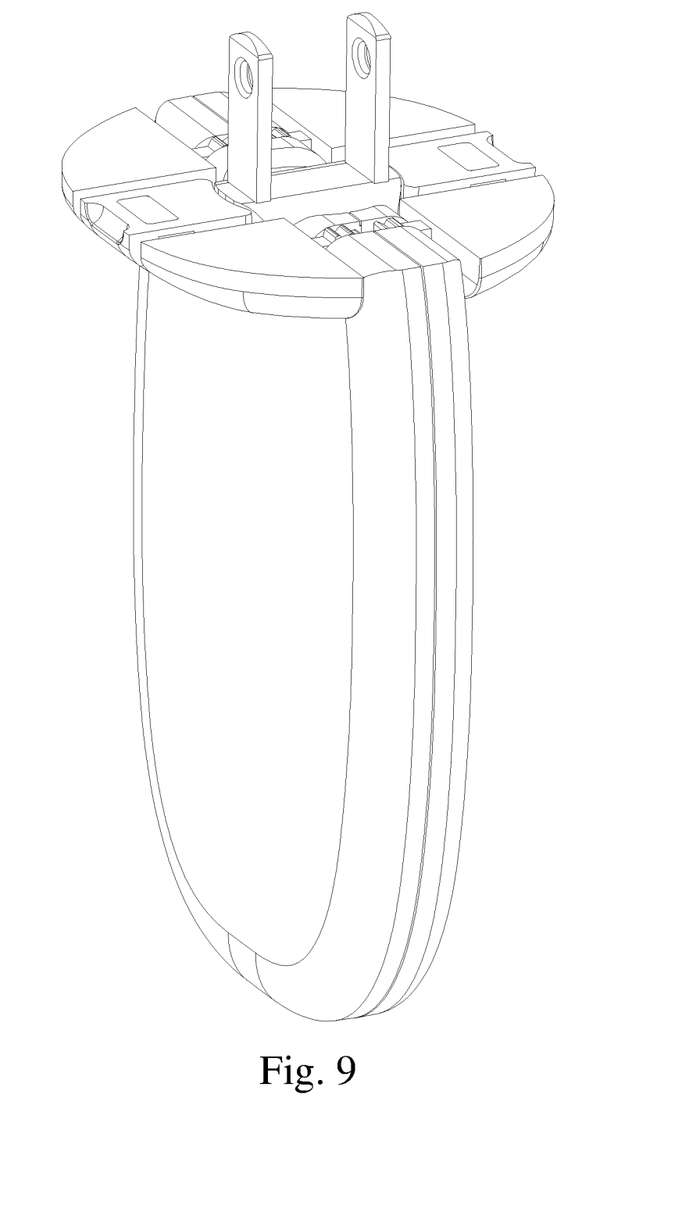
FIG. 9 is a schematic diagram showing the plug at position 90° according to an embodiment of the present application.

As shown in FIGS. 8 and 9, in an embodiment, the left pendulum body 71 is provided with a first pin slot 711, and the right pendulum body 81 is provided with a second pin slot 811. The pin 13 can be hidden in the cavity formed by the first pin slot 711 and second pin slot 811, which can protect the pin 13 when the charger is not in use.

In an embodiment, the left pendulum body 71 is provided with a left avoidance groove 712, and the right pendulum body 81 is provided with a right avoidance groove 812. When the left pendulum block 7 and the right pendulum block 8 swing to a fully unfolded state, the left avoidance groove 712 and the right avoidance groove 812 are recessed away from the plug 1. The concave directions of the left avoidance groove 712 and the right avoidance groove 812 are opposite. The distance between the left avoidance groove 712 and the right avoidance groove 812 is slightly longer than the length of the connecting part 11, so as to avoid hitting when the connecting part 11 rotates, and without blocking the connecting part 11.

The above descriptions are only preferred embodiments of the present application and are not intended to limit the present application. Any modifications, equivalent substitutions and improvements made within the spirit and principle of the present application shall be included in the protection scope of the present application.

What is claimed is:

1. A charger, comprising a charger body, a plug and a tooth ring;

the charger body is provided with a receiving cavity for receiving the plug, and the tooth ring is arranged in the charger body;

the plug comprises a connecting part, a positioning part and a pin, an upper surface of the connecting part exposes the receiving cavity, and the pin is installed on the upper surface of the connecting part, one end of the positioning part is connected to a lower surface of the connecting part, and another end of the positioning part extends into a central through hole of the tooth ring;

the central through hole of the tooth ring is provided with a clamping tooth, the positioning part is provided with a plurality of clamping grooves, and when the plug is rotated, the clamping tooth is clamped into one of the clamping grooves to limit rotation angle of the plug;

the positioning part comprises a positioning main body and a plurality of outer teeth arranged on the positioning main body, and the clamping groove is formed between the outer teeth and surface of the positioning main body and between two adjacent outer teeth; and the positioning main body is provided with a first side and a second side arranged oppositely, and both the first side and the second side are provided with the outer teeth; the clamping teeth comprise a first clamping tooth and a second clamping tooth, the first clamping tooth is clamped in the clamping groove on the first side, and the second clamping tooth is clamped in the clamping groove on the second side.

2. The charger of claim 1, wherein the plug further comprises a rotating part connected between the connecting part and the positioning part;

the receiving cavity comprises a first cavity, a second cavity and a spacer plate for separating the first cavity and the second cavity, the spacer plate is provided with a connecting hole communicating the first cavity and the second cavity, the rotating part is arranged in the connecting hole, the connecting part is arranged in the first cavity, and the positioning part is arranged in the second cavity.

3. The charger of claim 2, wherein an annular groove is arranged in the middle of the rotating part, and an edge of the connecting hole is arranged in the annular groove.

4. The charger of claim 2, wherein the tooth ring is provided with a flange, the second cavity is provided with a limit groove, and the flange is arranged in the limit groove.

5. The charger of claim 2, wherein the charger body comprises an upper cover and a lower cover connected in snap-fit, the upper cover is provided with a first groove, a second groove and a first spacer plate for separating the first groove and the second groove, the lower cover is provided with a third groove, a fourth groove and a second spacer plate for separating the third groove and the fourth groove; the first groove and the third groove form the first cavity, the second groove and the fourth groove form the second cavity, and the first spacer plate and the second spacer plate form the spacer plate.

6. The charger of claim 5, wherein the charger further comprises a left pendulum block rotatably connected to the upper cover and a right pendulum block rotatably connected to the lower cover;

the left pendulum block comprises a left pendulum body, a left gear and a left rotating shaft, the left gear is installed on the left pendulum body, the left rotating shaft is installed on the left gear, a left rotating groove is arranged on an inner surface of the upper cover, and the left gear and the left rotating shaft are arranged in the left rotating groove;

the right pendulum block comprises a right pendulum body, a right gear and a right rotating shaft, the right gear is installed on the right pendulum body, the right rotating shaft is installed on the right gear, a right rotating groove is arranged on an inner surface of the lower cover, and the right gear and the right rotating shaft are arranged in the right rotating groove;

the left gear is engaged with the right gear, and the left pendulum block and the right pendulum block can rotate to expose or hide the pin.

7. The charger of claim 6, wherein the left pendulum body is provided with a first pin slot, and the right pendulum body is provided with a second pin slot, and the pin can be hidden in a cavity formed by the first pin slot and the second pin slot.

8. The charger of claim 6, wherein the left pendulum body is provided with a left avoidance groove, and the right pendulum body is provided with a right avoidance groove, when the left pendulum block and the right pendulum block swing to a fully unfolded state, a distance between the left avoidance groove and the right avoidance groove is greater than a length of the connecting part, so as to avoid hitting the rotating connecting part.

\* \* \* \* \*